United States Patent [19]

Philipp

[11] 4,219,518

[45] Aug. 26, 1980

[54] METHOD OF IMPROVING VARISTOR UPTURN CHARACTERISTICS

[75] Inventor: Herbert R. Philipp, Scotia, N.Y.

[73] Assignee: General Electric Company, Schenectady, N.Y.

[21] Appl. No.: 905,589

[22] Filed: May 15, 1978

[51] Int. Cl.[2] .............................................. C04B 35/64

[52] U.S. Cl. ...................................... 264/66; 252/518; 252/521; 264/104

[58] Field of Search ......................... 264/61, 66, 104; 252/518, 521

[56] References Cited

U.S. PATENT DOCUMENTS

| | | | |
|---|---|---|---|
| 3,903,226 | 9/1975 | Iga et al. | 264/66 |
| 3,953,371 | 4/1976 | May | 264/61 |
| 4,094,061 | 6/1978 | Gupta et al. | 264/66 |

*Primary Examiner*—John A. Parrish
*Attorney, Agent, or Firm*—Alexander M. Gerasimow; James C. Davis; Marvin Snyder

[57] ABSTRACT

A method for producing varistors exhibiting improved upturn characteristics comprises controllably heating a pressed varistor powder mix to a temperature, and for a time, sufficient to form a ceramic material, and then quenching the ceramic material at a rate in excess of approximately 500° C. per hour. The method is particularly advantageous when dopants such as aluminum, antimony, indium, and gallium are employed. Additionally, a surge arrester is disclosed comprising a varistor connected in series with a spark gap, the varistor being produced in accordance with the aforementioned quenching method.

5 Claims, 4 Drawing Figures

Fig. 1
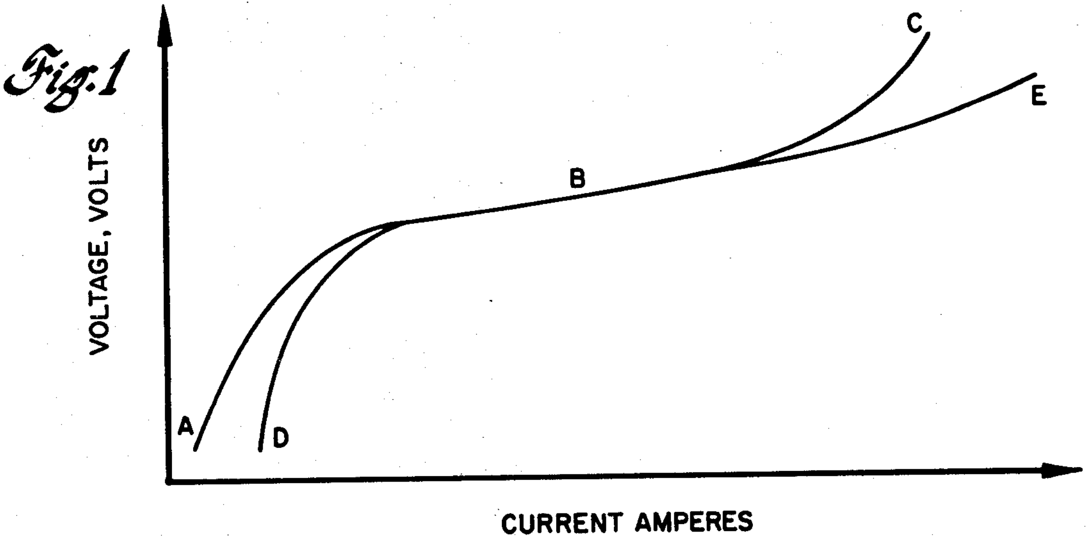
Fig. 2
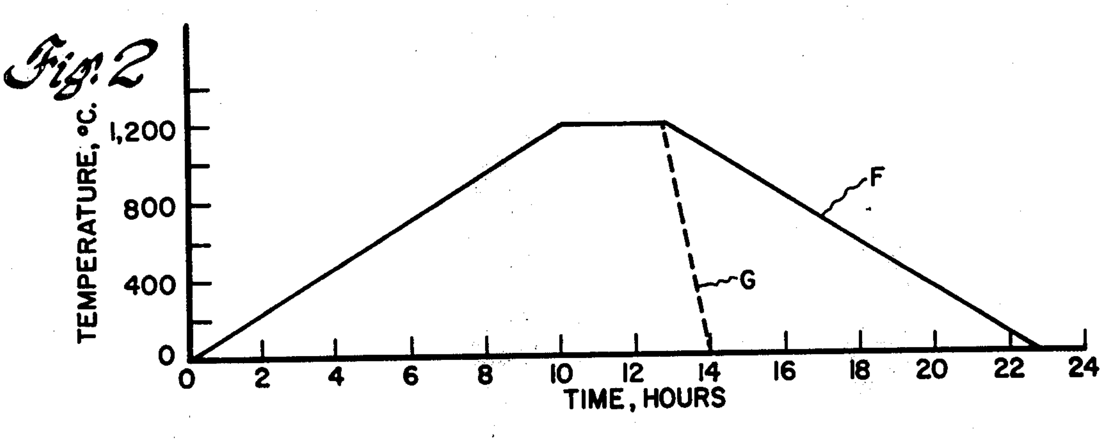
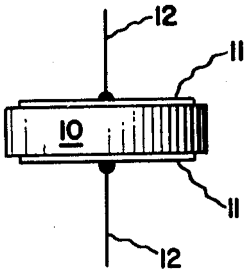
Fig. 3
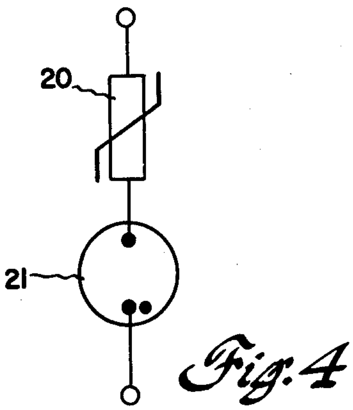
Fig. 4

METHOD OF IMPROVING VARISTOR UPTURN CHARACTERISTICS

BACKGROUND OF THE INVENTION

This invention relates to varistors, and more particularly to metal oxide varistors and methods used to reduce voltage increases (upturn) at high current levels, as well as to application employing these varistors.

In general, metal oxide varistor operation is governed by the following approximate equation:

$$I=(V/C)^{\alpha}$$

where I is the current through the varistor, V is the voltage across the varistor, $\alpha$ is the exponent or so-called coefficient of nonlinearity, and C is a parameter depending upon varistor geometry and material composition. For low values of current, the varistor behaves like a high resistance device. For higher values of current, the varistor behaves like a low resistance device. However, at very high current levels, there is a tendency for the varistor to become less conductive. This results in an increase in voltage across the varistor that is not predicted by the above equation but which is often interpreted as $\alpha$ being dependent on the current so that $\alpha$ decreases with increasing current at high current levels, resulting in an undesired voltage upturn. The value of $\alpha$ may be computed between any two points on the varistor current-voltage characteristic, such as, ($I_1$, $V_1$) and ($I_2$, $V_2$, by using the following formula, which may be readily found by elimination of the variable C from the above equation:

$$\alpha=ln(I_1/I_2)/ln\,(V_1/V_2).$$

The varistor operating in accord with the above equations also exhibits the ability to clamp the voltage across it at a predeterminable voltage level known as the breakdown or clamping voltage. The clamping voltage is most apparently reflected in the value for C in the first equation above and is typically controlled by a judicious selection of the thickness of the varistor is which is typically manufactured in the form of a disk or other body of relatively uniform thickness.

At the low current end of the varistor characteristic curve, the device desirably exhibits a high resistance and a correspondingly low value of current for a given voltage. This behavior is often characterized by the so-called "leakage current" which is defined as the current at one-half of the clamping voltage. Unfortunately, improvement at the high end of the characteristic curve (to reduce voltage upturn) has a tendency to increase the leakage current.

Metal oxide varistors are typically manufactured from a powder mixture comprising one-half mole percent bismuth oxide, one-half mole percent cobalt oxide, one-half mole percent manganese oxide, one mole percent antimony oxide one-half mole percent tin oxide, 0.1 mole percent barium oxide and 0.1 mole percent boron oxide, the remaining powder being zinc xide. This powder is pressed into the shape of a disk or other shape of relatively uniform thickness. The pressed disk is then sintered to form a ceramic material. Typically, the pressed material is raised to a temperature between approximately 900° C. and 1,500° C. over a period of approximately ten hours. The material is then maintained at a relatively constant temperature for approximately three hours or sufficiently long to form a ceramic composition. The varistor ceramic is then cooled at approximately the same rate it was heated. That is to say, typical cooling from approximately 1,200° C. to room temperature is carried out over a period of approximately ten hours at an approximate uniform rate of 120° C. per hour. Additionally, dopants such as aluminum, indium, or gallium may be included in the varistor powder mixture prior to sintering.

Summary of the Invention

In accordance with a preferred embodiment of the present invention, after heating to form a ceramic material during the process of fabricating a varistor, the varistor ceramic is quenched to room temperature at a rate of at least 500° C. per hour. This quenching occurs at a time in the temperature cycle following the maintenance of the varistor material at a relatively constant maximum temperature. As used herein, quenching does not require the immersion of the varistor material into any cooling liquids such as water. The quenching considered herein may advantageously by carried out by removing the varistor from the sintering apparatus and allowing it to cool in air at room temperature. The cooling rates employed in this process are approximately five times faster than the rates used in conventional varistor manufacture and preferably thirty times faster than such rates.

In accordance with another embodiment of the present invention, dopants are added to the varistor powder mix prior to pressing and sintering. The quenching process employed herein is particularly advantageous for reducing the voltage upturn at high current levels. In particular, the method of the present invention is useful for improving the upturn characteristics when dopants are present.

While the methods of the present invention improve the upturn characteristics, there is general tendency for the leakage current, as defined above, to increase. However, varistors manufactured in accordance with the present invention may advantageously be connected in series with spark gaps to form surge arresters having desirable electrical characteristics.

Accordingly, it is an object of the present invention to provide metal oxide varistors having improved upturn characteristics and which are useful for employment in surge arresters, especially those arresters configured as a series combination of a varistor and spark gap.

Description of the Drawings

FIG. 1 is a log-log plot of typical varistor voltage-current characteristics illustrating behavior in the low, middle, and high current ranges.

FIG. 2 is a temperature versus time plot illustrating the temperature profile in conventional varistor fabrication methods and also a typical temperature profile of the fabrication method of the present invention.

FIG. 3 is a side elevation view of a metal oxide varistor with leads and contacts applied.

FIG. 4 is a schematic diagram of a surge arrester comprising a spark gap configured in series with a metal oxide varistor.

Detailed Description of the Invention

FIG. 1 illustrates voltage-current characteristic curves for varistors exhibiting different leakage and upturn characteristics. For example, curve ABC typifies a varistor having relatively low leakage current but also having a higher than desirable upturn characteristic. On the other hand, curve DBE typifies a varistor having a relatively high leakage current but yet possessing a superior upturn characteristic. Since varistors are often used in circuits as protective devices for other circuit elements, and since the protection afforded by varistors stems directly from the ability of the varistor to clamp the voltage at a safe level, it is highly desirable that the upturn at high current levels be kept as small as possible as exemplified by the curve segment terminating at E. The methods of the present invention result in varistors exhibiting such an improved characteristic.

In conventional varistor manufacture, the pressed varistor powder mix is sintered typically in an air atmosphere, at temperatures as high as 1,500° C. for periods up to approximately 48 hours but more generally for periods of approximately 24 hours. Sintering temperatures as low as approximately 900° C. may alternatively be conventionally employed. However more typical sintering temperatures are between approximately 1,000° C., and 1,300° C. Typical graph illustrating the variation in sintering temperature with time is shown in FIG. 2. Here, the varistor material is heated from approximately room temperature to a temperature of approximately 1,200° C. over a period of approximately ten hours. Thus, for this initial heating period, the temperature increases at the rate of approximately 120° C. per hour. Varistor material is then maintained at a relatively constant temperature of approximately 1,200° C. for approximately three hours. Conventional varistor processing then follows the curve portion F shown in FIG. 2. In these prior forms of varistor processing, the furnace temperature is gradually lowered at approximately the same rate as it was increased, namely, approximately 120° C. per hour. Thus, after a period of approximately 23 hours, conventional varistor processing is complete except for the attachment of electrodes and wire leads.

However, in the present invention, the varistor temperature is lowered at a much higher rate. This more steeply sloped temperature profile is illustrated by curve portion G in FIG. 2 in which the rate of cooling is approximately 1,200° C. per hour which is approximately ten times faster than the conventional varistor cooling rate. Nonetheless, a mechanically integral ceramic varistor results, exhibiting improved upturn characteristics as typified by curve DBE of FIG. 1. While a cooling rate of approximately 3,000° C. per hour is preferred, satisfactory improvement in upturn results when the cooling (quenching) of the varistor material occurs at a rate as low as approximately 500° C. per hour. The maximum rate of cooling is limited only by the requirement that the resulting ceramic possess mechanical integrity.

Even though the quenching method described above appears to increase the zinc oxide grain conductivity, so that improved upturn characteristics result, there is a corresponding tendency for the leakage current to increase. Hence, varistors manufactured in accordance with the above method tend to have characteristics more closely similar to curve DBE than to curve ABC in FIG. 1. However, as described below, this is not a serious problem when varistors of the present invention are used in surge arresters utilizing a series connected spark gap. Additionally, additives such as boron or barium may be added to the varistor powder to control leakage.

The quenching method of the present invention is particularly advantageous in improving the upturn characteristics of varistors in which certain dopants are added which also serve to improve the upturn characteristics. In particular, when antimony, aluminum, indium, or gallium are used in concentrations between approximately 0.1 parts per million atomic and 1,000 parts per million atomic, the quenching method herein produces improved varistors having reduced upturn at high current values. This upturn improvement may advantageously be observed by comparing the values of α, the coefficient of nonlinearity, at high current levels for quenched and non-quenched samples. Such results are summarized in Table I below. For example, at current levels between 100 and 1,000 amperes per square centimeter, conventional varistor processing with ten parts per million atomic of aluminum produces an α of 6.9.

TABLE I

| | Sample No. (Thickness) (cm) | Additive | $10^{-7}$ | $10^{-4}$ | $10^{-3}$ | 10 | 30 | 100 | 300 | 1000 | Range $10^{-3}-10^{-4}$ | Range 10-100 | Range 100-1000 |
|---|---|---|---|---|---|---|---|---|---|---|---|---|---|
| | | | (Amperes/cm$^2$) | | | | | | | | | | |
| Conventional Process | 1 (0.1546) | 10 ppm Al | ~195 | 219.1 | 227.7 | 334 | 358 | 399 | 456 | 558 | 59.8 | 9.0 | 6.9 |
| | 2 (0.1640) | 10 ppm Al | ~210 | 227.0 | 235.7 | 323 | 375 | 428.5 | 479 | 585 | 61.2 | 7.8 | 7.4 |
| | 3 (0.1510) | 1000 ppm Al | ~47 | 235.3 | 285.1 | 411.5 | 430 | 458 | 491 | 554 | 12.0 | 15.5 | 12.1 |
| | 4 (0.1492) | 1000 ppm In | ~203 | 229.8 | 239.3 | 361.5 | 396.5 | 453 | 518 | 641 | 56.8 | 8.0 | 6.6 |
| | 5 (0.1500) | 1000 ppm In | ~198 | 219.1 | 228.1 | 346 | 381 | 432 | 493.5 | 612.5 | 57.2 | 8.1 | 6.6 |
| Quenched Process | 6 (0.1542) | 10 ppm Al | ~110 | 200.2 | 214.8 | 296.5 | 315 | 341 | 375.5 | 445 | 32.7 | 11.3 | 8.7 |
| | 7 (0.1618) | 10 ppm Al | ~97 | 205.9 | 222.4 | 305.5 | 326 | 354 | 392.5 | 467 | 29.9 | 10.9 | 8.3 |
| | 8 (0.1469) | 1000 ppm Al | ~18 | 127.7 | 186.6 | 409 | 431 | 462 | 490 | 543 | 6.1 | 16.3 | 14.3 |
| | 9 (0.1510) | 1000 ppm Al | ~14 | 131.0 | 200.5 | 404 | 425 | 457 | 483 | 537 | 5.4 | 16.2 | 14.3 |
| | 10 (0.1468) | 1000 ppm In | ~84 | 192.0 | 207.4 | 282 | 298 | 321 | 349 | 405 | 29.8 | 12.7 | 9.9 |
| | 11 | 1000 | | | | | | | | | | | |

TABLE I-continued

| Sample No. (Thickness) (cm) | Additive | $10^{-7}$ | $10^{-4}$ | $10^{-3}$ | 10 | 30 | 100 | 300 | 1000 | Range $10^{-3}-10^{-4}$ | 10-100 | 100-1000 |
|---|---|---|---|---|---|---|---|---|---|---|---|---|
| | | (Amperes/cm$^2$) | | | | | | | | | | |
| (0.1491) | ppm In | ~95 | 199.4 | 214.3 | 295 | 312 | 337 | 363 | 421 | 32.0 | 12.9 | 10.3 |

However, varistors subject to the quenching process of manufacture of the present invention exhibit an $\alpha$ of 8.7 for the same current (density) range. Similar results are obtained from varistors doped with up to 1,000 parts per million atomic aluminum and varistors doped with up to 1,000 parts per million atomic indium, as is shown in the last column of Table I.

While the exact mechanism for the resulting improvement stemming from quenching is not known, it is thought that the increased rate of cooling prevents thermal migration of dopant atoms from the zinc oxide grains to the layer of intergranular material that exists between the zinc oxide grains in a sintered ceramic, zinc oxide based varistor.

Table I also illustrates the fact that for lower values of current density, the quenching method tends to produce varistors with increased leakage. This fact is seen from the generally lower values of $\alpha$ for lower current density values in the lower portion of Table I, describing quenched varistors. This increased leakage phenomenon may however be at least partially mitigated by the addition of other additives such as barium or boron in concentrations ranging between approximately 0.1 mole percent to approximately 10 mole percent. These additives, as with the dopants discussed above, need not be added in their elemental forms but may be added, for example, as oxides or as any other convenient compound.

Even though the method of the present invention has a general tendency to increase the leakage current, nonetheless, the varistors produced in accordance with the present invention exhibit electrical characteristics which make them particularly desirable for use in surge arresters comprising a spark gap connected in series with a varistor. Such a series connection is shown in FIG. 4 in which metal oxide varistor 20 is serially connected with spark gap 21. In this configuration, the spark gap 21 is not normally conductive and normally no current flows through the combination irrespective of the leakage characteristics of the varistor 20. However, when a sufficiently large surge voltage is present, the spark gap 21 conducts but the varistor still operates to clamp the voltage at a predetermined, safe level. This clamping voltage is typically selected by a judicious choice of varistor thickness. Nonetheless, the methods of the present invention produce varistors better able to maintain the clamping voltage for high levels of current (or more exactly, current density).

A typical varistor manufactured in accordance with the present invention is shown in FIG. 3. Here sintered varistor ceramic 10 has electrodes 11 attached to opposing faces thereof. Attached to electrodes 11 are wide leads 12 for external circuit connection. Additionally, the entire varistor may be encapsulated in a packaging material leaving only the leads 12 exposed.

From the above, it can be appreciated that the present invention enables production of varistors having improved upturn characteristics and which therefore better function to clamp the voltage across the varistor at a safe level for high values of current through the varistor. Additionally, the methods of the present invention enhance the improvement in upturn characteristics that result from the addition of dopants such as aluminum, indium, or gallium, which also otherwise serve to enhance the upturn characteristics. It can also be appreciated that the varistors of the present invention are particularly useful in surge arresters comprising a series combination of a metal oxide varistor and a spark gap.

While this invention has been described with reference to particular embodiments and examples, other modifications and variations will occur to those skilled in the art in view of the above teachings. Accordingly, it should be understood that the appended claims are intended to cover all such modifications and variations as fall within the true spirit of the invention.

The invention claimed is:

1. A method for producing metal oxide varistors exhibiting improved upturn characteristics comprising:
- controllably heating a pressed varistor powder mix to a temperature between approximately 900° C. and 1,500° C. for a time sufficient to form a ceramic material; and
- controllably quenching said ceramic material at a rate in excess of approximately 500° C. to 3,000° C. per hour.

2. The method of claim 1 in which the varistor powder mix is doped with material selected from the group consisting of aluminum, antimony, indium, and gallium.

3. The method of claim 2 in which the dopant level is between approximately 0.1 parts per million atomic and 1,000 parts per million atomic.

4. The method of claim 1 in which the varistor powder mix contains additives selected from the group consisting of barium and boron.

5. The method of claim 4 in which the additives comprise between approximately 0.1 mole percent and 10 mole percent of said varistor powder mix.

* * * * *